(12) United States Patent
Cetinel et al.

(10) Patent No.: US 8,911,146 B2
(45) Date of Patent: Dec. 16, 2014

(54) DEVICE AND METHOD FOR MEASURING THE TEMPERATURE OF A WALL IN A VESSEL PREFORM

(75) Inventors: Ertan Cetinel, Octeville sur Mer (FR); Thierry Deau, Octeville sur Mer (FR); Guy Feuilloley, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 864 days.

(21) Appl. No.: 13/119,642

(22) PCT Filed: Sep. 16, 2009

(86) PCT No.: PCT/FR2009/001101
§ 371 (c)(1),
(2), (4) Date: May 27, 2011

(87) PCT Pub. No.: WO2010/031923
PCT Pub. Date: Mar. 25, 2010

(65) Prior Publication Data
US 2011/0236518 A1    Sep. 29, 2011

(30) Foreign Application Priority Data
Sep. 18, 2008  (FR) ..................................... 08 05139

(51) Int. Cl.
*G01K 1/16* (2006.01)
*G01J 5/04* (2006.01)
*B29B 13/02* (2006.01)
*G01J 5/00* (2006.01)
*B29C 49/78* (2006.01)
*B29C 71/00* (2006.01)
*B29K 67/00* (2006.01)
*B29C 49/64* (2006.01)
*B29C 35/08* (2006.01)
*B29C 37/00* (2006.01)
*B29C 35/02* (2006.01)

(52) U.S. Cl.
CPC ............. *B29C 49/78* (2013.01); *B29K 2067/00* (2013.01); *B29C 49/6427* (2013.01); *G01J 5/047* (2013.01); *B29B 13/024* (2013.01); *B29C 2035/0822* (2013.01); *G01J 5/0022* (2013.01); *B29C 2037/90* (2013.01); *G01J 5/04* (2013.01); *B29C 35/0288* (2013.01)
USPC .......................................... 374/120; 264/345

(58) Field of Classification Search
CPC ..................................................... B29B 13/024
USPC .............. 374/120, 131, 137, E1.021, E3.001; 425/170
See application file for complete search history.

(56) References Cited

U.S. PATENT DOCUMENTS 6,406,179 B2 *  6/2002  Adams et al. ................. 374/131
6,470,294 B1 * 10/2002  Taylor ........................... 702/172
(Continued)

FOREIGN PATENT DOCUMENTS

DE    10 2007 022 386 A1   11/2007
WO        02/087850 A1     11/2002
WO      2006/047260 A1     5/2006

*Primary Examiner* — Eric S McCall
*Assistant Examiner* — Nasir U Ahmed
(74) *Attorney, Agent, or Firm* — Sughrue Mion, PLLC

(57) ABSTRACT

A method of measuring the wall temperature of a container blank, including the following operations: inserting a temperature probe into the blank in motion, upon completion of the operation of heating the blank in an oven; maintaining the probe in the blank in motion for a predetermined time; making a temperature measurement by the probe maintained in the blank without contact with the inner wall of the blank; and storing the temperature or the temperature profile thus measured.

19 Claims, 6 Drawing Sheets

(56) References Cited

U.S. PATENT DOCUMENTS

| | | | |
|---|---|---|---|
| 6,487,440 B2 * | 11/2002 | Deckert et al. | 600/476 |
| 6,772,085 B2 * | 8/2004 | Watkins et al. | 702/130 |
| 6,776,543 B1 * | 8/2004 | Hall et al. | 400/56 |
| 8,517,711 B2 * | 8/2013 | Winzinger | 425/174.4 |
| 2003/0055307 A1 * | 3/2003 | Elmaleh et al. | 600/1 |
| 2004/0024560 A1 * | 2/2004 | Shelby et al. | 702/130 |
| 2004/0113326 A1 | 6/2004 | Gernhuber et al. | |
| 2006/0157896 A1 * | 7/2006 | Lee et al. | 264/345 |
| 2007/0096352 A1 | 5/2007 | Cochran et al. | |

\* cited by examiner

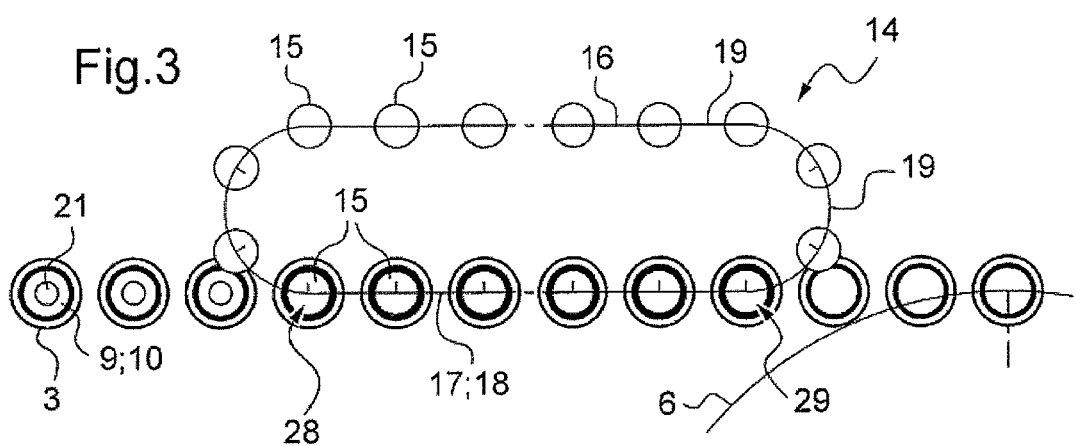
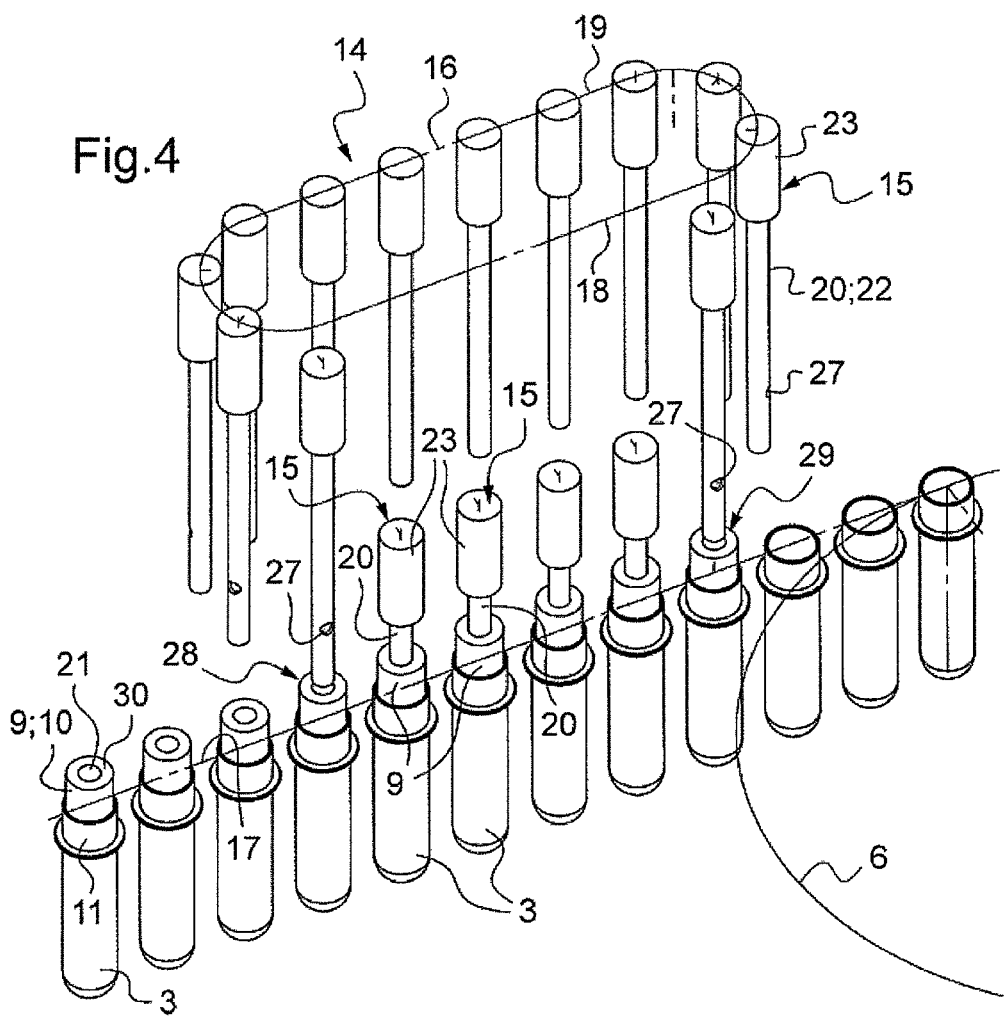

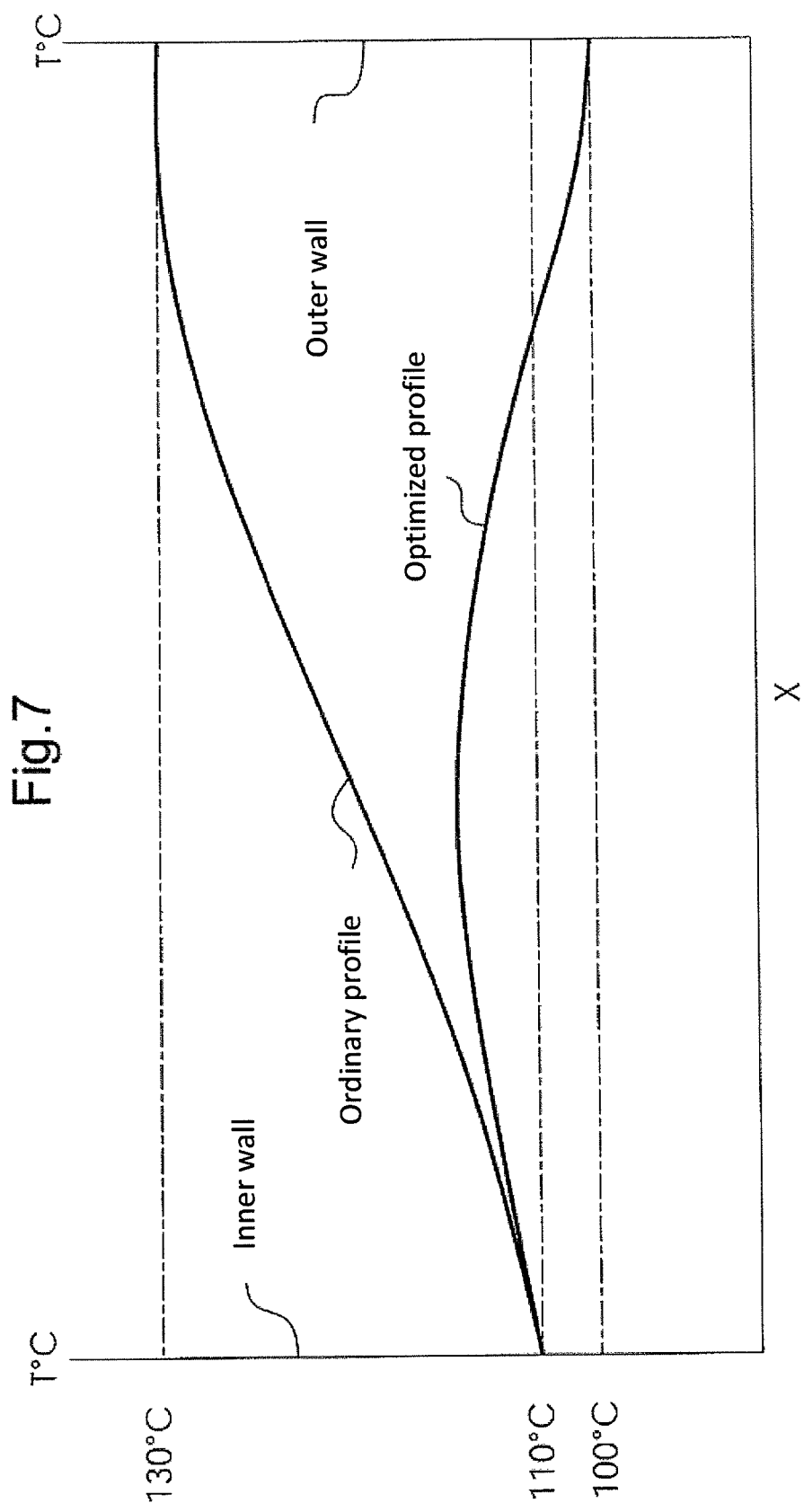

DEVICE AND METHOD FOR MEASURING THE TEMPERATURE OF A WALL IN A VESSEL PREFORM

The invention relates to the manufacture of containers from blanks of plastic material such as PET. The term "blank" as employed here designates a preform as well as an intermediate container having undergone a first blow forming and intended to undergo a second one in order to obtain the final container.

For purposes of simplification, which is in no way restrictive with regard to the type of manufacturing used, it is assumed that the blanks are preforms.

The operations for manufacturing containers comprise, in a known manner, a heating operation in which the preforms are exposed to infrared radiation from lamps or diodes of an oven through which the preforms pass. In order to enable a relatively uniform heating of the preforms, they are hooked by their neck from rotating hangers called "spinners."

Upon exiting the oven, each preform is inserted hot into a mold where it undergoes blow forming at high pressure, possibly coupled with stretching by means of a stretch rod.

The heating of the preforms, also called temperature conditioning, is a delicate operation due to the importance of the part the temperature of the material plays for the subsequent blow forming or stretch blowing operations.

On the one hand, the average temperature of the preform must be greater than the glass transition temperature of the material of which it is made (about 80° C. for PET), so as to allow a bi-orientation of the material during blow forming or stretch blowing, while being lower than the temperature (about 140° C. for PET) above which there is a risk of crystallization of the material, which would make the preform unsuitable for blow forming.

On the other hand, the temperature distribution within the preform itself has an impact on the quality of the final container, and in particular on its transparency and on the distribution of the material in the body and bottom of the container.

There are several aspects to the distribution of the temperature: around the circumference of the blank (i.e., angularly around the principal axis of the blank), axially (i.e., parallel to the axis), and in the thickness of its wall.

As a result of the rotation of the preforms during the heating, the circumferential distribution of the temperature is generally uniform, although for certain applications, it is useful to obtain a non-uniform circumferential distribution (see for example French patent no. FR 2 703 944 or its American equivalent, U.S. Pat. No. 5,681,522).

It is also possible to control the heating profile parallel to the axis of the preform, by controlling the power radiated by the lamps or diodes of the oven. If the axial uniformity of the temperature is generally desired, some applications require non-uniform profiles.

The distribution of the temperature in the thickness of the wall of the preform, on the other hand, is much more complex to control, even though it is essential for controlling the blow forming or stretch blowing.

In spite of a certain homogenization of the temperature by convection during heating, a temperature gradient generally persists in the thickness of the preform, and the complexity of heat exchanges occurring in the oven as well as the difficulty in measuring the heat exchange coefficients (with the air inside the preform, and with the air outside thereof) have not made it possible, as found by certain specialists, to provide a sophisticated model of the temperature distribution in the preform at the beginning of the blow forming or stretch blowing operation (see F. Schmidt, "Étude expérimentale et modélisation du procédé d'injection soufflage bi-orientation en cycle froid de bouteilles en PET" [Experimental study and modeling of the cold-cycle bi-orientation method of injection blow molding of PET bottles], École Nationale Supérieure des Mines de Paris Doctoral Thesis, 2005).

However, attempts in this direction have recently been carried out both at the experimental level (see for example P. Lebaudy, "Étude et simulation de la répartition des températures dans un cylindre creux de PET soumis à un rayonnement infrarouge" [Study and simulation of the distribution of temperatures in a hollow PET cylinder subject to infrared radiation], Université de Rouen Doctoral Thesis, 2009), as well as at the margins of industrial production (see for example American U.S. Pat. No. 6,839,652, which proposes a method for determining the temperature distribution in the thickness of a preform from laboratory measurements made by means of pyrometers disposed facing the wall of the preform).

To date, however, the solutions proposed to enable better control of the temperature distribution in the thickness of the wall are unsatisfactory from an industrial point of view, because the implementation is too complex. Sampling must be done on the production line to allow selective measurements, some of which are manual, on the sample preforms.

The samples require a transfer time from the line to the test bench, during which the temperature profile is modified (tending to homogenization by diffusion), so that the measurements do not reliably take into account the temperature distribution inside the preforms on the manufacturing line.

With respect to measurements made on the fly (see for example American U.S. Pat. No. 7,230,378), they require expensive sensors for which the reliability of measurements remains to be demonstrated, especially with respect to the temperature of the inner wall of the preform, measured remotely and instantaneously by the exterior thereof.

In particular, the invention seeks to remedy the abovementioned disadvantages, by proposing a solution making it possible to measure with increased reliability the wall temperature of a preform.

To that end, according to a first aspect, the invention proposes a method for measuring the wall temperature of a container blank, which comprises operations consisting of:

Inserting a temperature probe into the blank in motion, upon completion of the operation of heating the blank in an oven;

Maintaining the probe in the blank in motion for a predetermined time;

Making a temperature measurement by means of the probe maintained in the blank without contact with the inner wall of the blank;

Storing the temperature or the temperature profile thus measured.

The measurements, made directly on the manufacturing line between the heating and the blow forming, without sampling and without contact, make it possible, with no impact on the rate of production, to have at least one measurement of the inner wall temperature of the container for the benefit of improved regulation of heating.

A single temperature measurement can be provided on the inner wall of the blank, or multiple simultaneous temperature measurements at different heights on the inner wall of the blank.

Moreover, an additional operation can be provided of temperature measurement(s) on an outer wall of the blank, made simultaneously with the temperature measurement(s) or with each of the temperature measurements made on the inner wall and at the same level thereof.

According to a second aspect, the invention also proposes a device for measuring the inner wall temperature of a container blank, comprising a contactless temperature measuring unit, movably mounted along a circuit comprising a working section coinciding locally with a path of the blank and a buffer section separated from said path, said measuring unit being movably mounted between a standby position, adopted in the buffer section of the circuit away from the blank, and a measuring position, adopted in the working section of the circuit and in which the measuring unit is at least partially inserted into the blank in order to take a temperature measurement there without contact with an inner wall of the blank.

This device is suitable for the implementation of the measuring method presented hereabove.

In this device, the measuring unit comprises for example a probe provided with a tubular body in which an element is mounted for collecting infrared radiation emitted by the inner wall of the blank, an infrared sensor remote from the collection element, and a waveguide for transmitting the collected radiation to the sensor.

According to one embodiment, the probe comprises a head on top of the body and in which the infrared sensor is mounted.

The body of the probe is for example provided with a lateral aperture, and the collection element is for example a mirror disposed in the body at a lower end of the waveguide, facing the aperture, said mirror being inclined with respect to a principal axis of the body in order to reflect the infrared radiation at right angles in the waveguide.

With regard to the waveguide, it can be formed by a reflective coating covering an inner wall of the body of the probe. As a variation, fiber optics can be used.

The measuring unit can comprise a plurality of collection elements distributed over the height of the body, a plurality of sensors remote from the collection elements, and a plurality of waveguides between the collection elements and the sensors, so as to take a plurality of simultaneous measurements at different levels in the blank and thus produce a profile of the inner temperature of the blank on at least one part of the height thereof.

According to a preferred embodiment, the device comprises a plurality of measuring units mounted movably along the same circuit, so as to make a plurality of simultaneous measurements of temperatures on a plurality of blanks.

According to a third aspect, the invention proposes a measuring system comprising a device for measuring an inner wall temperature of a blank as presented above, supplemented by a device for measuring an outer wall temperature of the blank comprising a unit for measuring the outer wall temperature mounted movably in synchronism with a unit for measuring the inner wall temperature, in order to make a simultaneous measurement of the temperature(s) at the same level on the inner and outer walls of a blank.

According to a fourth aspect, the invention proposes a machine for manufacturing containers from blanks made of plastic, which comprises a measuring device or a measuring system as presented above.

Other objects and advantages of the invention will appear from the following description, with reference to the appended drawings in which:

FIG. 3 is a top view showing a device for measuring the wall temperature of preforms at the outlet of the oven of the machine of FIGS. 1 and 2;

FIG. 4 is a view in perspective of the measuring device of FIG. 3;

FIG. 7 is a diagram showing two distributions of temperatures in the wall of a preform, according to an ordinary profile, and according to an optimized profile.

Figure 1:
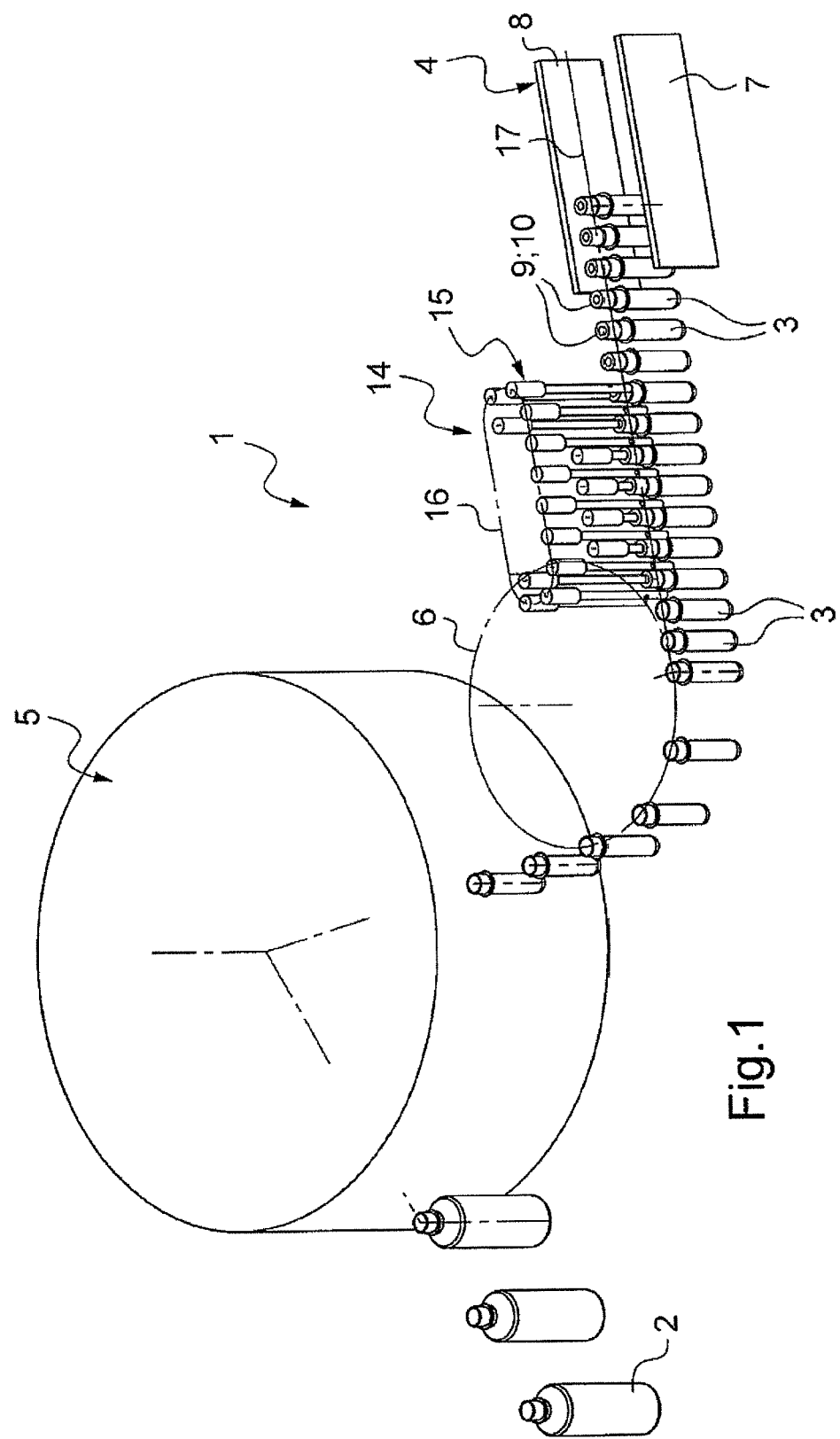
FIG. 1 is a view in perspective partially showing a machine for manufacturing containers from preforms.
Figure 2:
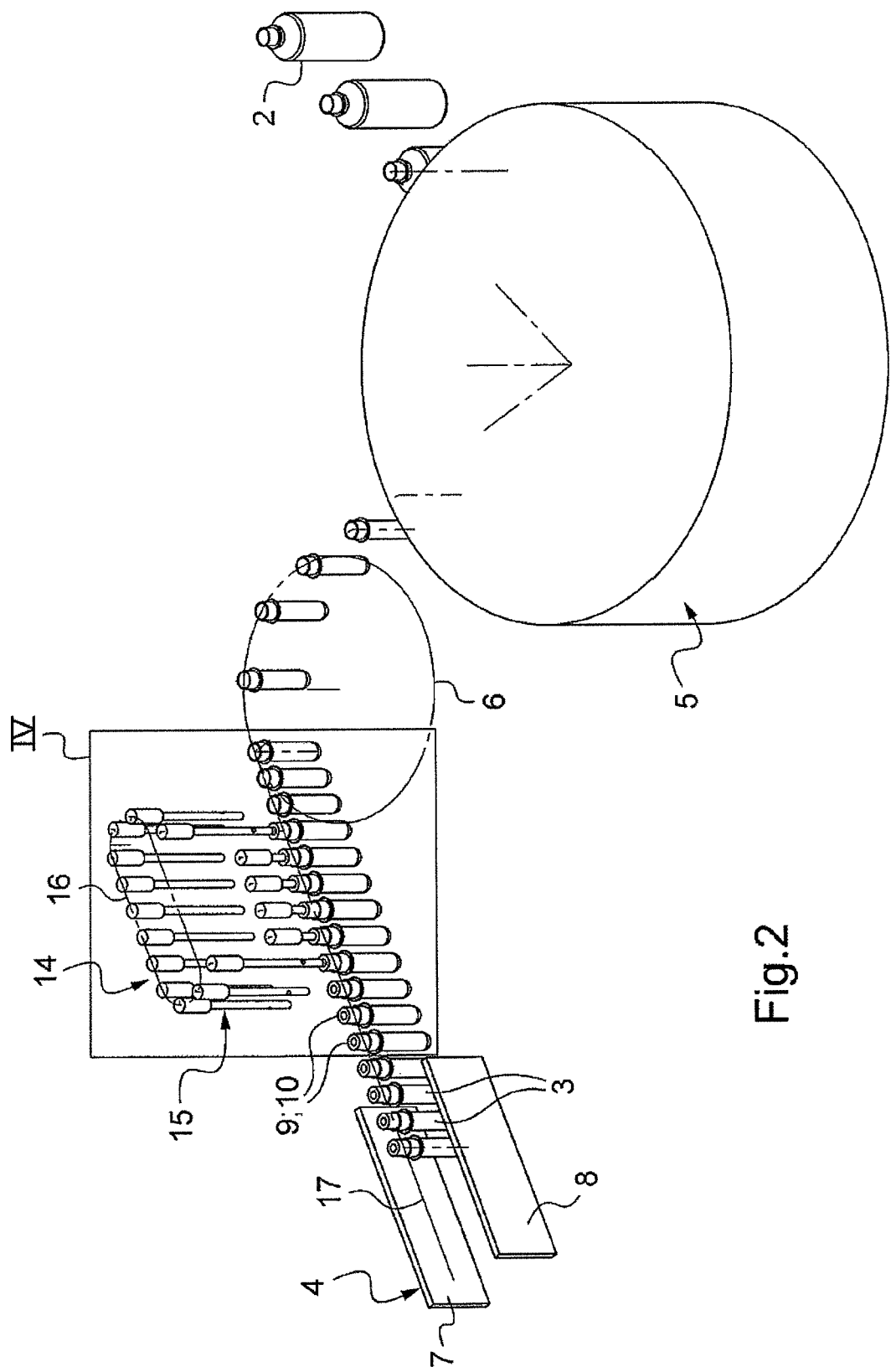
FIG. 2 is a view in perspective showing the machine of FIG. 1 from another angle of view.

Represented in FIG. 1 is a machine 1 for manufacturing containers 2 from preforms 3 made of plastic material such as PET. Said machine 1 comprises a heating unit 4, also called "oven" for simple convenience, a molding unit 5 provided with molds mounted on a carousel (represented diagrammatically in the form of a cylinder), and a transfer wheel 6 disposed upstream of the molding unit 5 to feed said molding unit with hot preforms 3 at a predetermined rate.

The preforms 3 are conveyed through the oven 4 in order to be heated therein prior to the blow forming or stretch blowing operations taking place within the molding unit 5. To that end, the oven 4 is equipped with lamps or diodes radiating in the infrared at a predetermined power and spectrum. The power and spectrum of the radiation are controlled by means of an operator's station that is not shown. In a conventional way, the lamps or diodes line a wall 7 of the oven 4, an opposite wall 8 providing at least a partial reflection of the radiation in order to optimize the heating.

Each preform 3 is hooked to a rotating hanger 9, also called spinner, which comprises a pin 10 fitted into the neck 11 of the preform 3, as well as a pinion meshing with a fixed chain running along the path followed by the preforms inside the oven 4, so as to ensure a substantially uniform rotation of the preform 3 during its heating. It should be noted that the conveyance of the preforms 3 can either be done with the neck upward (as in the example illustrated) or neck downward.

The heating of the preforms 3 is performed in such a way that at the entrance of the molding unit 5 they have an average temperature higher than the glass transition temperature of the material (i.e., about 80° C. for the PET). The quality of the final container depends in large part on the quality of the heating, apart from intrinsic defects of the preforms 3 that the manufacturing process generally cannot correct, but which are relatively rare. On the contrary, a non-optimized heating of the preforms 3 can at least cause defects in shape of the final containers, and even unsuitability of the preforms 3 for blow forming.

Thus, a temperature of the preform 3 that is too low can induce in the final container a whitish pearlescent appearance, a result of an overstretching of the preform 3 causing a breaking of the polymerized long chains at the molecular level. On the contrary, a temperature of the preform 3 that is too high can cause a spherolytic crystallization of the material, rendering the preform 3 unsuitable for blow forming.

More specifically, one of the essential parameters to take into account in order to ensure success of the blow forming or the stretch blowing is the temperature distribution in the thickness of the preform 3.

In the absence of optimization, the ordinary temperature profile generally has a strong gradient between the inner wall 12 and the outer wall 13, with a comparatively higher temperature in the outer wall 13, as is represented in the diagram of FIG. 7, in which x designates the thickness of the preform 3.

The inventors have noted that the final container had good visual and structural qualities (in particular good transparency, relatively homogeneous thickness) if the temperature distribution had an optimized profile as represented in the diagram of FIG. 7: low gradient between the inner wall and outer wall, temperature comparatively higher in the inner wall.

The control of this distribution can be accomplished by adjusting various parameters of the machine 1 associated with the heating, in particular:
the ventilation (cooling) instruction for the preforms 3,
the thermal stabilization time of the preforms 3,
the time of exposure of the preforms 3 to radiation, and
the speed of rotation of the preforms 3 on themselves.

These settings are performed manually or automatically based on the temperature measurements made on the preforms 3 exiting the oven, under the conditions that will now be described.

As illustrated in FIGS. 1 to 6, the machine 1 comprises a device 14 for measuring the temperature of the inner wall 12 of the preforms 3 exiting the oven 4.

As can be seen in FIGS. 1 to 4, the device 14 comprises a plurality of measuring units 15 movably mounted along a closed-loop circuit 16 extending along the path 17 (in this instance, substantially linear) of the preforms 3 upon exiting the oven 4. The circuit 16 comprises a working section 18, which coincides locally with the path 17 of the preforms 3, and in which the measuring units 15 are coupled to the preforms 3 that they accompany over a predetermined distance in order to measure the temperature, and a buffer section 19, separate from the path 17 of the preforms 3, in which the measuring units 15 are decoupled from the preforms in order to undergo a recirculation accompanied by a thermal reconditioning (i.e., in practice, a free or forced cooling, for example by means of ventilation) in order to perform the subsequent temperature measurement.

Each measuring unit 15 comprises a tubular probe 20, intended to be inserted into a preform 3 through a hole 21 made in the pin 10 of the spinner 9, in order to measure the temperature of the inner wall 12 of the preform 3.

The probe 20 comprises a hollow cylindrical body 22 extending along a principal axis A (oriented vertically) and capped by a head 23 in which, at the junction with the body 22 at an upper end thereof, an infrared sensor 24 is mounted, coupled to an electronic system for processing the signal (not shown).

Figure 5:
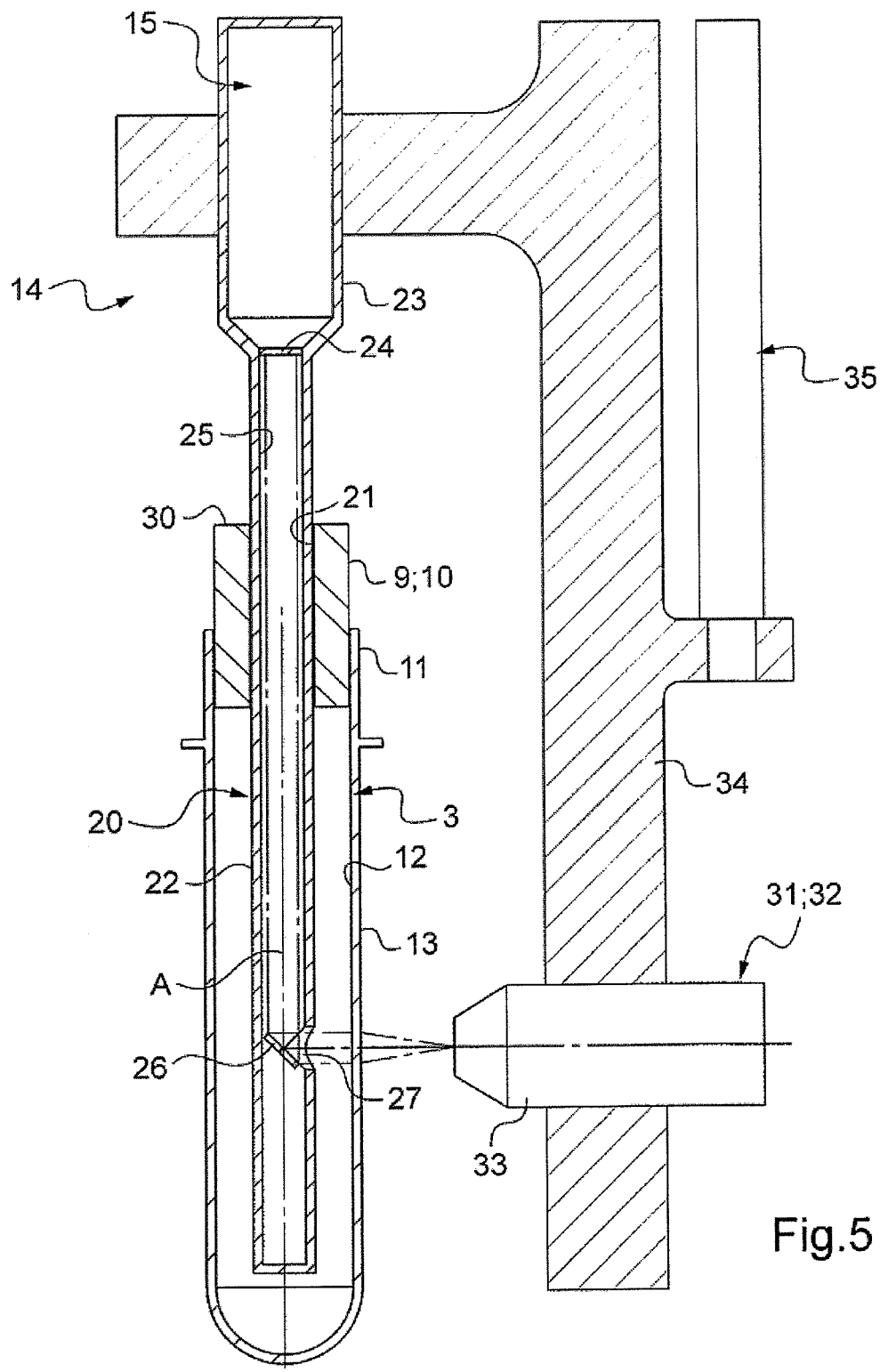
FIG. 5 is an elevation view in cross-section partially showing the device of FIG. 4, according to a first embodiment.

According to a first embodiment illustrated in FIG. 5, the measuring unit 15 is a monosensor, the body 22 of the probe forming a waveguide 25 formed by a cylindrical inner wall covered by a reflective coating. A mirror 26 is mounted in the body 22 away from the sensor 24 at a lower end of the waveguide 25.

The mirror 26 is disposed at the level of and facing an aperture 27 made in the body 22, and it is inclined with respect to the axis A at an angle of about 45°, so that a light wave penetrating through the aperture 27 perpendicular to the axis A of the body is collected by the mirror 26 and reflected by it substantially parallel to the axis A in the direction of the sensor 24. This configuration makes it possible to perform a temperature measurement at a single height on the inner wall 12 of the preform. The 45° angle of inclination of the mirror 26 is here given by way of example, the reflection of the wave at a right angle corresponding to a greater architectural simplicity of the measuring unit 15.

Figure 6:
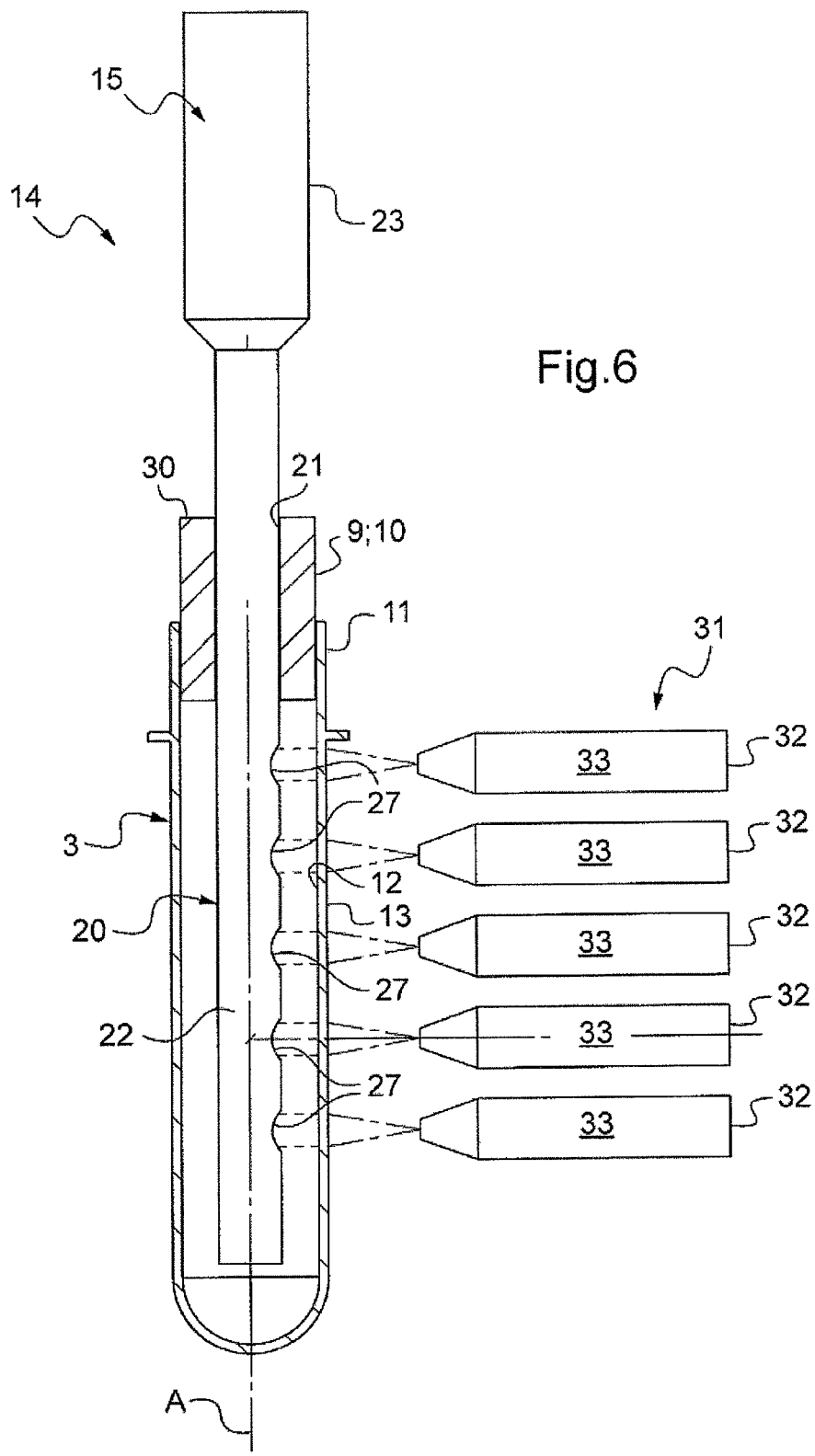
FIG. 6 is a similar view to FIG. 5, according to a second embodiment.

According to a second embodiment illustrated in FIG. 6, the measuring unit 15 has multiple sensors, the probe 20 comprising a plurality of sensors associated with a plurality of apertures 27 made at different heights in the body 22 in order to allow a plurality of temperatures to be taken (preferably simultaneously) on the inner wall 12 of the preform 3, at different heights. The general structure of the probe 20 can be derived from that of the single sensor unit 15 described above, a plurality of mirrors being disposed facing apertures and separately connected to their respective sensors by means of different infrared waveguides, extending parallel to the axis A of the body 22. As a variation, the transmission of the infrared signal can be accomplished by fiber optic means connecting infrared detectors mounted facing apertures, and remote sensors located in the head 23 in order to relay the signal to the electronic processing system.

It should be noted that the measurements are not necessarily pinpoint, but can zero in on localized zones with a surface area of no more than a few square millimeters.

As can be seen in FIGS. 3 and 4, the working section 18 extends between a coupling zone 28, where the measuring units 15 are inserted vertically into the preforms 3, and a decoupling zone 29, where the measuring units 15 are removed from the preforms 3.

The predetermined length of the working section 18 on which the measurements are made is selected based on several parameters, including the reactivity of the measuring unit 15 (as a function of its thermal inertia and performance of the sensor 24, and particularly on its integration time, i.e., the interval of time between the capture of the signal by the photosites of the sensor 24 and the conversion of the signal received into digital data), the speed of travel of the preforms 3, and their speed of rotation.

Preferably, the measurement will be made over one complete turn of the preform 3, in order to have the temperature profile of the inner wall 12 over the entirety of the circumference of the preform 3.

As can be seen in FIG. 4, the measuring units 15 are fixed in rotation, and preserve their radial orientation during their movement, which consequently is effected by pure translation along their circuit 16. Although the working section 18 locally follows the [path] 17 followed by the preforms 3, the buffer section 19 has a shape and length independent of said path 17. In the example illustrated, which is in no way limiting, the circuit 16 has an oblong profile (substantially in the form of a race track).

Each measuring unit 15 is fixed on a support 34 slidably mounted vertically (for example by means of a cam, as represented in FIG. 5, or of an actuator 35) and moving along the circuit 16 between:
a standby position (or up position in the configuration illustrated where the preforms 3 are conveyed neck up), adopted by the measuring unit 15 in the buffer section 19, in which the unit 15 extends above the preforms 3 (more specifically above a plane containing an upper face 30 of the pins 10 of the spinners 9,
a measuring position (or down position in the configuration illustrated in particular in FIG. 5), adopted by the measuring unit 15 in the working section 18, in which the unit 15 extends at the level of the preforms 3 in order to enable the taking of temperature on the inner wall 12.

In the coupling zone 28, each measuring unit 15 is taken tangentially to the vertical of a preform 3 and passes quickly (in a fraction of a second) from its standby position to its measuring position, the probe 20 being inserted into the preform 3 in order to measure the inner wall 12 temperature there.

The probe 20 remains in the preform for a predetermined amount of time along the working section 18 while measuring the temperature, before being removed in the decoupling zone 29 by a reverse movement to the one described above.

Because the probe 20 has undergone heating due to its prolonged exposure to the hot atmosphere inside the preform 3, it may be desirable to subject it to thermal reconditioning along the buffer section 19. This thermal reconditioning can be free, i.e., the ambient air in which the measuring device 14 is located is deemed to be sufficient to provide suitable cooling of the measuring units 15 for their reuse in the next cycle, or forced by means of appropriate ventilation generating a pulsed airflow toward the measuring units 15. This airflow is preferably directed toward the probes 20. However, while the head 23 of each measuring unit 15 is not inserted in the preform 3, heating of the sensor 24 cannot be excluded due to the rising hot airflow accompanying each preform 3, due to the phenomenon of thermal convection. It should be noted that because of its thermal inertia, the heating of the sensor 24 is stabilized after startup or restart of production. It can be of benefit to take advantage of the heating of the sensor 24 by not promoting its cooling along the buffer section 19, in order to accelerate its reactivity when taking the next measurement.

The measurements taken are stored, to feed them into a feedback program implemented in a central unit for controlling the machine's parameters, in order to act on various parameters already mentioned above: heating temperature, ventilation instruction, speed of travel, speed of rotation of the preforms.

Moreover, the machine 1 can be equipped with an additional device 31 for measuring the temperature of the outer wall 13 of the preforms 3, which comprises a plurality of measuring units 32 movably mounted on a closed-loop circuit extending along the path 17 of the preforms 3 at their outlet of the oven, and accompanying them along the working section 18 covered by the internal temperature measuring device 14. The measuring units 15, 32 of the two devices 14, 31 are synchronized so that the internal and external temperatures are taken simultaneously.

According to a first embodiment, illustrated in FIG. 5, each measuring unit 32 comprises a single sensor 33 disposed so as to measure the temperature of the outer wall 13 of the preform 3 at the same level as the internal temperature is measured, in order to have, in addition to an absolute temperature measurement, an evaluation of the temperature difference between the inner wall 12 and the outer wall 13. The internal and external measurements are performed at the same level, i.e., at the same cylindrical coordinates on the preform 3 (same height and at the same angle). The internal 24 and external 33 sensors are preferably attached to the same support 34, so as to ensure perfect coincidence of the measuring axes, as well as a synchronized movement of the sensors 24 and 33 in the vertical direction.

According to a second embodiment, illustrated in FIG. 6, each measuring unit 32 comprises a series of sensors 33 disposed vertically in order to measure temperatures on the outer wall 13 of the preform 3 at the same levels as the internal temperature measurements, in order to have, in addition to a plurality of temperatures at different heights in the preform 3, corresponding differences in temperature between the inner wall 12 and the outer wall 13.

A thermal reconditioning such as the one mentioned above can be provided for the external temperature measuring units 32, the sensors 33 of which also tend to heat up in the proximity of the preforms 3 when the temperature is measured.

Of course, the heating of the external sensors 33 can be controlled better than the heating of the internal sensors 24, in that the distance to the preform 3 can be freely adjusted. Therefore, sensors 33 can be chosen, such as from thermal imaging cameras, having sufficient focusing distance to limit heating.

By way of example, a sensor such as the OPTRIS® CONNECTION TERMINAL Laser, model G5LCF3 can be selected (French specifications available online at www.optris.de/fr/pdfs/cTlaser.pdf) in this perspective, it would be suitable with a focusing distance of 200 mm for a hot-spot diameter of about 2.9 mm.

The device 14 for measuring internal temperature, possibly coupled with the device 31 for measuring external temperature in order to form a comprehensive temperature measuring system, enables a systematic temperature measurement to be made of the preforms 3, without sampling, without impacting the manufacturing process, and in particular without impacting the rate of manufacturing.

Concerning more specifically the dual (internal and external) temperature measurement, this measurement makes it possible to determine the temperature difference (called "delta") between the inner wall and the outer wall. The delta thus obtained is a value representative of the quality of heating and makes it possible to provide the best adjustment of the machine parameters so as to obtain the desired heating profile.

Numerous variations can be provided without going beyond the general scope of the invention, particularly for adapting the measurement to the general configuration of the machine 1.

Thus, in the examples described above, it is assumed that the preforms are driven in rotation at the outlet of the oven, in the same way as inside the oven. In the event the machine 1 does not include means for placing the preforms 3 in rotation when exiting the oven 4, it may seem necessary to provide means for placing the measuring units 15 of the internal temperature in rotation in order to obtain a temperature profile over the internal (and possibly external) circumference of the preform 3. Similarly, the measuring unit 15 can be configured to make the temperature measurements jointly on the inner wall 12 and the outer wall 13. To that end, it can be set up alone and have an internal probe and an external probe connected to a common head equipped with sensors for each probe.

The invention claimed is:

1. A method of measuring the wall temperature of a container blank, comprising:
   Inserting a temperature probe into the blank in motion, upon completion of the operation of heating the blank in an oven;
   Maintaining the probe in the blank in motion for a predetermined time;
   Making a temperature measurement by means of the probe maintained in the blank without contact with the inner wall of the blank;
   Storing the temperature or the temperature profile thus measured.

2. The method according to claim 1, wherein a single temperature measurement is made on the inner wall of the blank.

3. The method according to claim 1, wherein a plurality of temperature measurements are made simultaneously at different heights on the inner wall of the blank.

4. The method according to claim 1, which comprises an additional operation of temperature measurement(s) on an outer wall of the blank, performed simultaneously with the temperature measurement(s) or with each of the temperature measurements performed on the inner wall, at the same level thereof.

5. A device for measuring the inner wall temperature of a container blank, comprising a contactless temperature measuring unit, movably mounted along a circuit comprising a working section coinciding locally with a path of the blank and a buffer section separated from said path, said measuring unit being movably mounted between a standby position, adopted in the buffer section of the circuit away from the blank, and a measuring position, adopted in the working section of the circuit and in which the measuring unit is at least partially inserted into the blank in order to take a temperature measurement there without contact with an inner wall of the blank.

6. The device according to claim 5, wherein the measuring unit comprises a probe provided with a tubular body in which a collection element is mounted for collecting infrared radiation emitted by the inner wall of the blank, an infrared sensor remote from the collection element, and a waveguide for transmitting the collected radiation to the sensor.

7. The device according to claim 6, wherein the probe comprises a head on top of the body and in which the infrared sensor is mounted.

8. The device according to claim 6, wherein the body of the probe is provided with a lateral aperture, and wherein the collection element is a mirror disposed in the body at a lower end of the waveguide, facing the aperture, said mirror inclined with respect to a principal axis (A) of the body in order to reflect the infrared radiation at right angles in the waveguide.

9. The device according to claim 6, wherein the waveguide is formed by a reflective coating covering an inner wall of the body of the probe.

10. The device according to claim 6, wherein the waveguide is fiber-optic.

11. The device according to claim 5, wherein the measuring unit comprises a plurality of collection elements distributed over the height of the body, a plurality of sensors remote from the collection elements, and a plurality of waveguides between the collection elements and the sensors.

12. The device according to claim 5, which comprises a plurality of measuring units mounted movably along the same circuit.

13. A measuring system comprising a device for measuring an inner wall temperature of a blank according to claim 5, and a device for measuring an outer wall temperature of the blank comprising a unit for measuring the outer wall temperature mounted movably in synchronism with a unit for measuring the inner wall temperature, in order to make a simultaneous measurement of the temperature(s) at the same level on the inner and outer walls of a blank.

14. A machine for manufacturing containers from blanks of plastic material, which comprises a measuring device according to claim 5.

15. A method of measuring the wall temperature of a container blank, comprising:
 inserting a temperature probe into the blank;
 maintaining the temperature probe in the blank while the blank is conveyed along a conveying path;
 taking a temperature measurement with the temperature probe while the temperature probe is maintained in the blank while the blank is conveyed.

16. The method of claim 15, further comprising taking multiple temperature measurements and storing the temperature measurements.

17. The method of claim 15, wherein the temperature probe is inserted into the blank following heating of the blank in an oven.

18. The method of claim 15, wherein the temperature measurement is taken without the temperature probe contacting an inner wall of the blank.

19. The method of claim 15, wherein temperature probe comprises an element that collects infrared radiation emitted from an inner surface of the blank.

* * * * *